(12) United States Patent
Francis et al.

(10) Patent No.: US 7,647,193 B2
(45) Date of Patent: Jan. 12, 2010

(54) AUTHENTICATION OF PHARMACEUTICALS USING MOLECULAR COMPUTATIONAL IDENTIFICATION

(75) Inventors: Arthur R. Francis, Raleigh, NC (US); Ruthie D. Lyle, Durham, NC (US); Veronique L. Moses, Raleigh, NC (US); Denny Pichardo, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/018,629

(22) Filed: Jan. 23, 2008

(65) Prior Publication Data

US 2009/0187364 A1    Jul. 23, 2009

(51) Int. Cl.
*G01N 37/00* (2006.01)
(52) U.S. Cl. .................. 702/82; 235/491; 382/115; 705/58
(58) Field of Classification Search ........... 702/52, 702/68, 81, 182, 185, 188, 82; 340/568.1, 340/572.1; 705/58; 235/491; 382/115
See application file for complete search history.

(56) References Cited

U.S. PATENT DOCUMENTS

2007/0012784 A1    1/2007    Mercolino
2007/0086625 A1    4/2007    Polli et al.
2007/0219916 A1*   9/2007    Lucas .......................... 705/58
2008/0169926 A1*   7/2008    Reep ........................ 340/572.1
2008/0303665 A1*  12/2008    Naik et al. ............... 340/568.1

FOREIGN PATENT DOCUMENTS

WO    2004038645 A1    5/2004

* cited by examiner

*Primary Examiner*—John H Le
(74) *Attorney, Agent, or Firm*—Robert Straight, Esq.; Steven M. Greenberg, Esq.; Casey, Rodriguez, Greenberg & Paul, LLP

(57) ABSTRACT

A method, apparatus and computer program product for authenticating a pharmaceutical product is provided. The method includes receiving an identifier and a quantity for the pharmaceutical product and receiving a photonic signal from the pharmaceutical product, wherein the photonic signal includes a frequency and amplitude. The method can further include searching for the identifier and quantity that was received in a predefined list comprising identifier-quantity pairs, wherein a frequency and amplitude corresponds to each identifier-quantity pair. The method can further include matching the identifier and quantity that was received to a first identifier-quantity pair in the list. The method can further include storing a record indicating that the pharmaceutical product is counterfeit if the frequency and amplitude of the photonic signal does not match the frequency and amplitude corresponding to the first identifier-quantity pair.

20 Claims, 1 Drawing Sheet

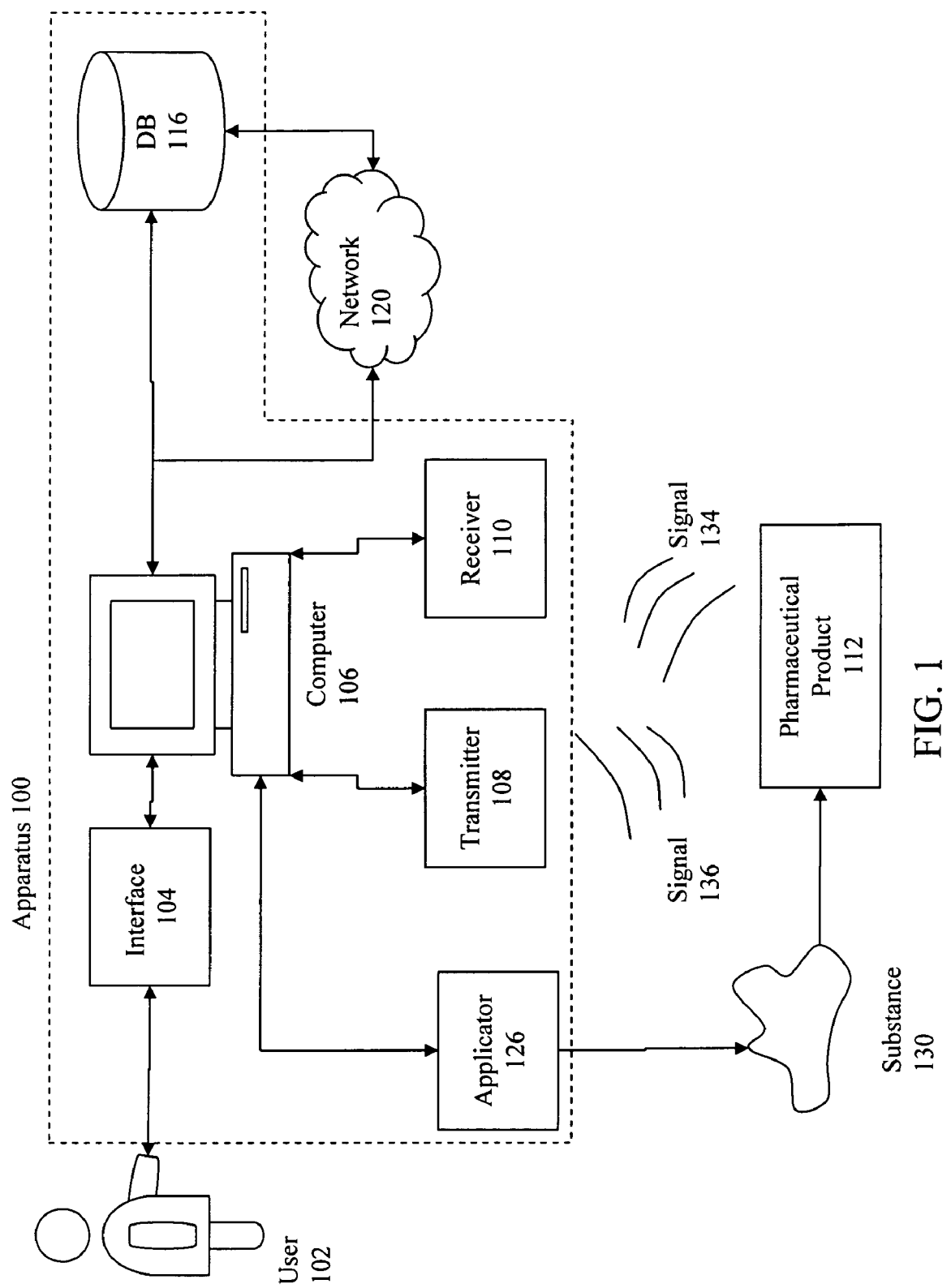

AUTHENTICATION OF PHARMACEUTICALS USING MOLECULAR COMPUTATIONAL IDENTIFICATION

BACKGROUND OF THE INVENTION

1. Field of the Invention

The present invention relates to pharmaceuticals, and more particularly to the authentication of pharmaceuticals.

2. Description of the Related Art

Counterfeit pharmaceuticals are one of the most critical issues facing the pharmaceutical industry today. The World Health Organization estimates that 5-8 percent of worldwide trade in pharmaceuticals is counterfeit. Counterfeit pharmaceuticals are products manufactured without the authorization and supervision of the trademark holder and may contain contaminants or incorrect amounts of active ingredients. While purchases made over the Internet or from other countries are the most likely to be counterfeit, even a local pharmacy can unwittingly be carrying the illicit items. Packaging and distribution of counterfeit pharmaceuticals are sophisticated global operations, with a complex network of wholesalers who buy and sell medicines. Counterfeiters further use forged paperwork and packaging to slip counterfeit pharmaceuticals into commerce to be shipped to legitimate pharmacies nationwide.

With regard to counterfeit pharmaceutical production, several countries are emerging as sources of great concern. Products may be concealed among shipments of similar items from the source countries and entered into the U.S. economy in international freight. A further problem with counterfeit pharmaceuticals is the fact that many counterfeit pharmaceutical products come from illegal operations with very poor controls and may contain ingredients that could be harmful. A recent report released by the Centre for Medicines in the Public Interest projected counterfeit drug sales to reach $75 billion in 2010, a 92 percent increase from 2005. The report estimates counterfeit drug sales will grow 13 percent a year through to 2010, compared to just 7.5 percent estimated annual growth for global pharmaceutical commerce. In addition to counterfeiting, there is also an ongoing problem of product diversion as well as the reintroduction of expired products into the supply chain.

Liability issues, consumer confidence, and brand erosion costs are driving pharmaceutical manufacturers to adopt technologies to combat this growing global problem. Over the past year, various systems of "track and trace" technologies and product authentication technologies have debuted for applying both bar codes and radio frequency identification (RFID) tags to preserve product integrity. Many pharmaceutical companies have conducted RFID trials that aim to keep fake drugs out of U.S. commerce, but the technology has significant limitations. An RFID tag attached to drug containers can be used as a tracking device for the container, not as a mechanism for securing the pharmaceutical product inside the container. Thus, RFID tags cannot provide assurance to users that the pharmaceutical product is authentic, the RFID tag only provides a record of authentication of the pharmaceutical product's journey through the supply chain.

Therefore, there is a need to improve the processes of the prior art and more particularly for a more efficient way for authenticating legitimate pharmaceuticals.

BRIEF SUMMARY OF THE INVENTION

Embodiments of the present invention address deficiencies of the art in respect to pharmaceutical product authentication and provide a novel and non-obvious method, apparatus and computer program product for authenticating a pharmaceutical product. In one embodiment of the invention, a method for authenticating a pharmaceutical product includes receiving an identifier and a quantity for the pharmaceutical product and receiving a photonic signal from the pharmaceutical product, wherein the photonic signal includes a frequency and amplitude. The method can further include searching for the identifier and quantity that was received in a predefined list comprising identifier-quantity pairs, wherein a frequency and amplitude corresponds to each identifier-quantity pair. The method can further include matching the identifier and quantity that was received to a first identifier-quantity pair in the list. The method can further include storing a record indicating that the pharmaceutical product is counterfeit if the frequency and amplitude of the photonic signal does not match the frequency and amplitude corresponding to the first identifier-quantity pair.

In another embodiment of the invention, a computer program product comprising a computer usable medium embodying computer usable program code for authenticating a pharmaceutical product can include computer usable program code for receiving an identifier and a quantity for the pharmaceutical product and computer usable program code for receiving a photonic signal from the pharmaceutical product, wherein the photonic signal includes a frequency and amplitude. The computer program product can further include computer usable program code for searching for the identifier and quantity that was received in a predefined list comprising identifier-quantity pairs, wherein a frequency and amplitude corresponds to each identifier-quantity pair. The computer program product can further include computer usable program code for matching the identifier and quantity that was received to a first identifier-quantity pair in the list. The computer program product can further include computer usable program code for storing a record indicating that the pharmaceutical product is counterfeit if the frequency and amplitude of the photonic signal does not match the frequency and amplitude corresponding to the first identifier-quantity pair.

In yet another embodiment of the invention, an apparatus for authenticating a pharmaceutical product can be provided. The apparatus can include a data interface for receiving an identifier and a quantity for the pharmaceutical product and a receiver for receiving a photonic signal from the pharmaceutical product, wherein the photonic signal includes a frequency and amplitude. The apparatus can further include a processor configured for searching for the identifier and quantity that was received in a predefined list comprising identifier-quantity pairs, wherein a frequency and amplitude corresponds to each identifier-quantity pair and for matching the identifier and quantity that was received to a first identifier-quantity pair in the list. The apparatus can further include a memory for storing a record indicating that the pharmaceutical product is counterfeit if the frequency and amplitude of the photonic signal does not match the frequency and amplitude corresponding to the first identifier-quantity pair.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a block diagram illustrating the various components of a pharmaceutical authentication apparatus, in accordance with one embodiment of the present invention.

DETAILED DESCRIPTION OF THE INVENTION

The present invention provides a pharmaceutical authentication apparatus 100 for authenticating a pharmaceutical product 112. Molecular computational identification (MCID) is a technology used to identify molecules using photonic emissions from the molecules. MCID uses the fact that molecules emit photonic signals corresponding to their composition. Photonic emissions are stimulated from a molecule using a chemical, or a mix of chemicals, that cause light to be emitted from the molecule. The character of the light can be used identify the molecule that emitted the light. Thus, the use of MCID is analogous to Radio Frequency Identification (RFID) since an emission from an item is used to identify an item. To further the analogy, molecules are analogous to RFID tags, which are tiny chips that broadcast a unique identifier when queried.

In an embodiment of the present invention, the process of preparing a substance for identification using MCID begins with imbuing the substance with fluorescent dyes that act as molecular logic gates. Each dye used is a single logic gate with one chemical input and one fluorescence output in a chosen color. For a given emission color, excitation color, and chemical input, four logic tags are provided. To identify a substance, it is first watched in a solution, such as an acid, and its fluorescence is observed. IT is later washed with an alkali and its fluorescence is again observed. The fluorescence output pattern describes which type of logic tag is attached to the substance.

By employing different logic types in different combinations in the substance, different chemical inputs, and different excitation and observation wavelengths, it is possible to generate millions of distinguishable tags. The final MCID tag address of a given substance can be read sequentially from left to right. For example, excitation wavelength, emission wavelength, logic type and combination, inputs, and binding threshold for each input, is read.

FIG. 1 is a block diagram illustrating the various components of a pharmaceutical authentication apparatus 100, in accordance with one embodiment of the present invention. Note that the apparatus 100 comprises various components surrounded by a dashed line in FIG. 1. The apparatus 100 encompasses the functions and processes that are executed in the course of authenticating a pharmaceutical product 112. It is assumed that the molecules of the pharmaceutical product 112 have been prepared for MCID. That is, it is assumed that during manufacturing of the pharmaceutical product 112, the molecules of the pharmaceutical product 112 have been imbued with the proper characteristics so as to enable a unique photonic signal to be emitted by the molecules when stimulated.

FIG. 1 further shows a user 102 interacting with data interface 104 of apparatus 100 so as to authenticate pharmaceutical product 112. For exemplary purposes, the pharmaceutical product 112 shall heretofore be defined as a dozen 10-milligram pills of the drug atorvastatin. In one embodiment, the data interface 104 may be a data input device such as a keyboard, a type pad, a key pad, a set of buttons, or a touch screen. The user 102 enters data describing the pharmaceutical product 112 into data interface 104. The data entered may be, among other things, a text identifier for the pharmaceutical product 112, such as the text string "atorvastatin," a number of pills, such as the number 12, and a dosage for each pill, such as "10 milligrams."

In an alternative embodiment, the data interface 104 may be a data port such as a serial data port, a USB port or a FireWire port. In this alternative embodiment, the data interface 104 receives the pertinent data regarding the pharmaceutical product 112, such as a text identifier, a number of pills and a dosage for each pill, from another device which detects and/or measures the pharmaceutical product 112 and garners the pertinent data.

Also shown connected to data interface 104 in FIG. 1 is a computer 106 which substantially performs the authentication functions of the present invention. The computer 106 comprises a computer or group of computers that are coupled, such as via a network. Connected to the computer 106 is an applicator 126 that applies a substance 130, such as a liquid, to the pharmaceutical product 112 so as to stimulate the emission of a photonic signal. In another embodiment, the computer 106 uses a transmitter 108 to emit a signal 136, such as a radio frequency signal, a photonic signal or a microwave signal, directed towards the pharmaceutical product 112.

Subsequently, a photonic signal 134 is emitted by the pharmaceutical product 112 and received by the receiver 110, which forwards information pertinent to the photonic signal 134 to the computer 106. This information may include the frequency of the photonic signal 134, the amplitude of the photonic signal 134, the modulation of the photonic signal 134 and the duration of the photonic signal 134.

Subsequently, the computer 106 accesses a predefined list stored in database 116, which is a repository or a memory element residing on the computer 106. Alternatively, the database 116 can be a remotely located repository that is accessed by computer 106 via a network, such as a LAN or the world wide web. The predefined list provides a conglomeration of data that associates photonic signal data with particular pharmaceutical products. For example, the predefined list may associate a pharmaceutical name, a pill amount and a dosage amount with a frequency value and an amplitude value. Below is an example of such a predefined list.

| Drug Name | # of Pills | Dosage | Frequency | Amplitude |
|---|---|---|---|---|
| atorvastatin | 12 | 10 milligrams | 130 Mhz | 18 nm |
| lovastatin | 12 | 30 milligrams | 150 Mhz | 22 nm |
| fluvastatin | 12 | 40 milligrams | 44 Mhz | 6 nm |
| simvastatin | 12 | 80 milligrams | 130 Mhz | 19 nm |
| pitavastatin | 12 | 10 milligrams | 5 Hz | .01 nm |

After receiving the pertinent data regarding the photonic signal 134, the predefined list above is searched for the entered data (see above) describing the pharmaceutical product 112, such as a text identifier for the pharmaceutical product 112, a number of pills, and a dosage for each pill. In this example, the entered text identifier for the pharmaceutical product 112 is the text string "atorvastatin," the entered number of pills is the number 12, and the entered dosage for each pill is "10 milligrams." Thus, the predefined list above is searched for the aforementioned entered data.

It can be seen that the aforementioned entered data is found in the first column of the example predefined list above. Next, the data received from the receiver 110 regarding the photonic signal 134 (such as the frequency of the photonic signal 134 and the amplitude of the photonic signal 134) is compared to the frequency and amplitude data in the first column of the predefined list above. That is, the signal data received from receiver 110 is compared to the signal data in the predefined list that corresponds to the pharmaceutical name, number of pills and dosage of the pharmaceutical product 112.

If the signal data received from receiver 110 matches the signal data in the predefined list that corresponds to the pharmaceutical name, number of pills and dosage of the pharmaceutical product 112, then the pharmaceutical product 112 is deemed authentic. If the signal data received from receiver 110 does not the signal data in the predefined list, then the pharmaceutical product 112 is deemed counterfeit. The computer 106 subsequently stores a record in memory indicating whether the pharmaceutical product 112 is deemed authentic or counterfeit. In an embodiment of the present invention, the computer 106 subsequently provides visual text or graphics via a display, such as a monitor, indicating whether the pharmaceutical product 112 is deemed authentic or counterfeit.

The present invention provides advantages over the prior art as the use of the predefined list above allows for the identification of counterfeit pills. This is due to the fact that an authentic pill will provide a photonic MCID signal at a particular frequency and amplitude. A counterfeit pill made wholly of counterfeit material, however, will not provide a photonic MCID signal. Likewise, a counterfeit pill made of diluted genuine material will produce a photonic MCID signal at the same frequency as the authentic pill but at a lower amplitude because a smaller percentage of the molecules in the diluted pill are producing the photonic MCID signal.

The present invention further provides advantages over the prior art as the use of the predefined list above allows for the identification of a set of pills that contain some authentic pills and some counterfeit pills. This is due to the fact that a number of authentic pills in a first group will provide a photonic MCID signal at a particular frequency and amplitude. The same number of pills in a second group, however, that include some authentic pills and some counterfeit pills will also produce a photonic MCID signal at the same frequency but at a lower amplitude because fewer pills in the second group are producing the photonic MCID signal.

The present invention further provides advantages over the prior art as the pharmaceutical authentication process can be used at point of sale locations. The apparatus 100 can be encased in a manageable housing that can be easily deployed to point of sale locations. Therefore, in addition to its use in various other locations during the pharmaceutical production process, such as during packaging and/or shipping, the pharmaceutical authentication process can be implemented for use during the point of sale, thereby lowering or eliminating the chances that a counterfeit pharmaceutical is sold to end users of the drug.

In embodiments of the present invention, certain portions of the apparatus 100 can take the form of an entirely hardware embodiment, an entirely software embodiment or an embodiment containing both hardware and software elements. In a preferred embodiment, certain portions of the apparatus 100 are implemented in software, which includes but is not limited to firmware, resident software, microcode, and the like. Furthermore, certain portions of the apparatus 100 can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code (such as described for computer 106) will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method executing on a computer system for authenticating a pharmaceutical product, comprising:
   receiving via a human input device an identifier and a quantity for the pharmaceutical product;
   receiving a photonic signal from the pharmaceutical product, wherein the photonic signal includes a frequency and amplitude;
   searching for the identifier and quantity that was received in a list stored in memory, the list comprising identifier-quantity pairs, wherein a frequency and amplitude corresponds to each identifier-quantity pair;
   matching the identifier and quantity that was received to a first identifier-quantity pair in the list; and
   storing in memory a record indicating that the pharmaceutical product is counterfeit if the frequency and amplitude of the photonic signal does not match the frequency and amplitude corresponding to the first identifier-quantity pair.

2. The method of claim 1, further comprising:
   storing in memory a record indicating that the pharmaceutical product is authentic if the frequency and amplitude of the photonic signal matches the frequency and amplitude corresponding to the first identifier-quantity pair.

3. The method of claim 2, further comprising:
   displaying on a computer display an indicator that the pharmaceutical product is counterfeit if the frequency and amplitude of the photonic signal does not match the frequency and amplitude corresponding to the first identifier-quantity pair.

4. The method of claim 3, further comprising:
displaying on a computer display an indicator that the pharmaceutical product is authentic if the frequency and amplitude of the photonic signal matches the frequency and amplitude corresponding to the first identifier-quantity pair.

5. The method of claim 2, wherein the first step of receiving comprises:
prompting a user to enter an identifier and a quantity for the pharmaceutical product into a user interface via a human input device; and
receiving an identifier and a quantity for the pharmaceutical product via the user interface.

6. The method of claim 5, wherein the second step of receiving comprises:
sending a first photonic signal directed towards the pharmaceutical product; and
receiving a photonic signal from the pharmaceutical product responsive to sending the first photonic signal, wherein the photonic signal includes a frequency and amplitude.

7. The method of claim 2, wherein the first step of receiving comprises:
scanning the pharmaceutical product; and
receiving a signal from the pharmaceutical product, wherein the signal corresponds to an identifier and a quantity for the pharmaceutical product.

8. The method of claim 7, wherein the second step of receiving comprises:
sending a first photonic signal directed towards the pharmaceutical product; and
receiving a photonic signal from the pharmaceutical product responsive to sending the first photonic signal, wherein the photonic signal includes a frequency and amplitude.

9. A computer program product comprising a computer usable medium embodying computer usable program code for authenticating a pharmaceutical product, comprising:
computer usable program code for receiving via a human input device an identifier and a quantity for the pharmaceutical product;
computer usable program code for receiving a photonic signal from the pharmaceutical product, wherein the photonic signal includes a frequency and amplitude;
computer usable program code for searching for the identifier and quantity that was received in a list stored in memory, the list comprising identifier-quantity pairs, wherein a frequency and amplitude corresponds to each identifier-quantity pair;
computer usable program code for matching the identifier and quantity that was received to a first identifier-quantity pair in the list; and
computer usable program code for storing in memory a record indicating that the pharmaceutical product is counterfeit if the frequency and amplitude of the photonic signal does not match the frequency and amplitude corresponding to the first identifier-quantity pair.

10. The computer program product of claim 9, further comprising:
computer usable program code for storing in memory a record indicating that the pharmaceutical product is authentic if the frequency and amplitude of the photonic signal matches the frequency and amplitude corresponding to the first identifier-quantity pair.

11. The computer program product of claim 10, further comprising:
computer usable program code for displaying on a computer display an indicator that the pharmaceutical product is counterfeit if the frequency and amplitude of the photonic signal does not match the frequency and amplitude corresponding to the first identifier-quantity pair.

12. The computer program product of claim 11, further comprising:
computer usable program code for displaying on a computer display an indicator that the pharmaceutical product is authentic if the frequency and amplitude of the photonic signal matches the frequency and amplitude corresponding to the first identifier-quantity pair.

13. The computer program product of claim 10, wherein the first computer usable program code for receiving comprises:
computer usable program code for prompting a user to enter an identifier and a quantity for the pharmaceutical product into a user interface via a human input device; and
computer usable program code for receiving an identifier and a quantity for the pharmaceutical product via the user interface.

14. The computer program product of claim 13, wherein the second computer usable program code for receiving comprises:
computer usable program code for sending a first photonic signal directed towards the pharmaceutical product; and
computer usable program code for receiving a photonic signal from the pharmaceutical product responsive to sending the first photonic signal, wherein the photonic signal includes a frequency and amplitude.

15. The computer program product of claim 10, wherein the first computer usable program code for receiving comprises:
computer usable program code for scanning the pharmaceutical product; and
computer usable program code for receiving a signal from the pharmaceutical product, wherein the signal corresponds to an identifier and a quantity for the pharmaceutical product.

16. The computer program product of claim 15, wherein the second computer usable program code for receiving comprises:
computer usable program code for sending a first photonic signal directed towards the pharmaceutical product; and
computer usable program code for receiving a photonic signal from the pharmaceutical product responsive to sending the first photonic signal, wherein the photonic signal includes a frequency and amplitude.

17. A computer system for authenticating a pharmaceutical product, comprising:
a data interface for receiving an identifier and a quantity for the pharmaceutical product;
a receiver for receiving a photonic signal from the pharmaceutical product, wherein the photonic signal includes a frequency and amplitude;
a processor configured for:
searching for the identifier and quantity that was received in a predefined list comprising identifier-quantity pairs, wherein a frequency and amplitude corresponds to each identifier-quantity pair; and
matching the identifier and quantity that was received to a first identifier-quantity pair in the list; and
a memory for storing a record indicating that the pharmaceutical product is counterfeit if the frequency and amplitude of the photonic signal does not match the frequency and amplitude corresponding to the first identifier-quantity pair.

18. The computer system of claim 17, further comprising:
a memory for storing a record indicating that the pharmaceutical product is authentic if the frequency and amplitude of the photonic signal matches the frequency and amplitude corresponding to the first identifier-quantity pair.

19. The computer system of claim 18, further comprising:
a computer display for:
 displaying an indicator that the pharmaceutical product is counterfeit if the frequency and amplitude of the photonic signal does not match the frequency and amplitude corresponding to the first identifier-quantity pair; and
 displaying an indicator that the pharmaceutical product is authentic if the frequency and amplitude of the photonic signal matches the frequency and amplitude corresponding to the first identifier-quantity pair.

20. The computer system of claim 19, wherein the data interface comprises a user interface for prompting a user to enter an identifier and a quantity for the pharmaceutical product into a user interface and for receiving an identifier and a quantity for the pharmaceutical product entered by the user.

* * * * *